Feb. 20, 1951  L. BORDIGONI  2,542,895
SET SHIFT DEVICE
Filed Aug. 27, 1946

INVENTOR
LOUIS BORDIGONI
By *G J Freeman*
ATTORNEY.

Patented Feb. 20, 1951

2,542,895

UNITED STATES PATENT OFFICE 2,542,895

SET SHIFT DEVICE

Louis Bordigoni, Geneva, Switzerland, assignor to Divar S. A., Geneva, Switzerland, a corporation of Switzerland Application August 27, 1946, Serial No. 693,239
In Switzerland September 7, 1945

7 Claims. (Cl. 33—81)

1

The present invention relates to a set shift device.

This apparatus comprises a slide guide which can be fixed in a definite position in relation to the surface upon which the said motif is to be traced and a carriage which slides on the said guide and to which is attached a guiding member for the tracing instrument, said carriage being fitted with a pivoted arm, an oscillating lever, and a back motion member preferably composed of a spring, the pivoted arm being fitted at its free end with a roller, the oscillating lever being intended through an outward pressure, to cause the roller to rotate in one direction while exerting upon it a power which applies the latter in the direction of the slide guide in order that the rotation of the roller in the said direction induces the forward motion of the carriage, the back motion member bringing back the roller and the movable parts of the carriage to their original position with relation to the latter without causing the motion of the carriage when the lever is not under control of the outward pressure and does not thereby exert on the roller a pressure in direction of the slide guide.

The guiding member for the tracing instrument may be, for example, a ruler, and the apparatus may then be used for tracing parallel lines, their interval being very regular because of the predetermined and regular displacement of the carriage. The apparatus can be used for tracing any other graphic motif, such as rows of circles, etc. It will thus enable decorative motifs consisting of regularly spaced repetitions of a given motif, background screens, etc., to be obtained.

The amplitude of the oscillating motion of the lever may be adjusted, thus allowing full control of the displacement of the carriage.

In a preferred form of the invention, the apparatus comprises a slidable member which travels in a groove in the slide guide in which it is maintained by the roller, a driving member connecting said roller to said slidable member, the whole being arranged in such manner that when the roller is operated in the direction of forward motion of the carriage, the slidable member on one hand is locked in said groove by the pressure exercised upon it by the roller, and on the other hand the roller drags on the slidable member through the driving member in order to displace the carriage.

The guiding member of the tracing instrument may be detachable and of any convenient shape, i. e. ruler, etc.

One embodiment of the apparatus according

2 to the present invention is shown, by way of example, in the attached drawing.

Figure 2:
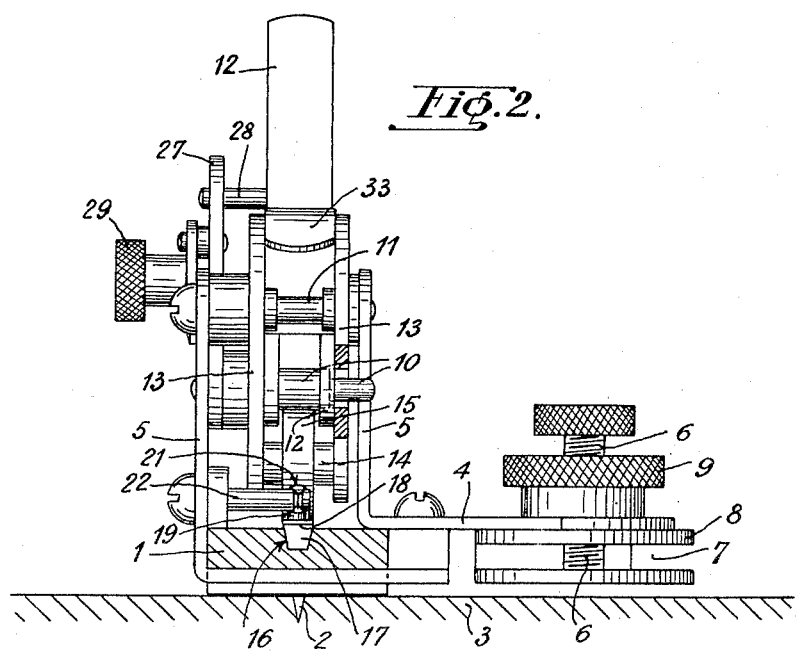
Figure 2 is also an elevation showing a view perpendicular to that of Figure 1.

The apparatus shown comprises a slide guide 1 designed to be fixed in a definite position in relation to the surface upon which it is intended to trace a motif. If this surface is that of a sheet of paper, the slide guide 1 will be fixed by means of points 2 in the drawing board 3 which supports the paper. For example, the slide guide 1 may be fixed parallel to and on the left side of the board 3. A carriage 4 is slidably fixed upon the slide guide 1 and comprises two supports 5; it is provided for holding the guiding member of the tracing instrument. With this intention it is fitted with retaining means for the guiding member (not shown). These retaining means (shown in the lower right-hand part of Figure 2) consist of a knurled head screw 6 which fits into a slot 7 of a support 8. The support 8 can rotate on the carriage 4 around the axis of screw 6 and may be locked to the carriage by means of the knurled nut 9 fitted to the screw 6 which is itself fitted on the support 8.

Spindles 10 and 11 are fitted between the supports 5 of the carriage 4. The spindle 10 supports the oscillating lever 12 whereas the spindle 11 serves to support the pivoted arm 13 carrying the spindle 14 and the roller 15.

The slide guide 1 has a longitudinal groove 16 of trapezoidal form which supports a slide member 17, of similar shape.

A driving member 18 consisting of a supple metallic ribbon is fixed by a pillar 19 at one end to the slide member 17 and at the other end to the roller 15 by a screw 20. The pillar 19 is fixed to the carriage 4 by a power member or back-motion member, namely a coiled spring 21. One end of this spring 21 is thus fixed to the pillar 19, and the other end to a stem 22 joined to the carriage 4. The spring 21 is provided in order to exert a constant pull on the pillar 19, thus pulling the slide member 17 and the band 18 towards the stem 22.

The lever 12 pivoted on the spindle 10 has a projection 23 carrying a pin 24 which engages in a slot 25 of the roller 15. The amplitude of oscillation of the lever 12 is limited on one hand by a stop 26 in one of the supports 5, and on the other hand by the roller 15, the oscillating lever 12 stopping at one time against the stop 26, and at another time against the roller 15. The travel of the lever 12 may also be limited in the direction of the stop 26 by an arm 27 co-operating with a stop 28 fixed to the lever 12. The arm 27 pivoted on the spindle 10 may be locked with reference to one of the carriage supports 5, at different angles, by means of a knurled nut 29.

The apparatus described above operates as follows:

The slide guide 1 is fixed on and parallel to the left side of a drawing board 3. If it is desired to trace parallel lines, a ruler is fixed in the slot 7 and by the screw 6 to the carriage 4. The angle given to the ruler will depend on the angle at which the lines are required; when fixed, the ruler is locked in relation to the carriage 4 by the nut 9. The interval between lines depends on the travel of lever 12 which is determined by the position of arm 27. Once this position is fixed, said arm is locked in relation to the support 5 by means of the nut 29.

Figure 1:
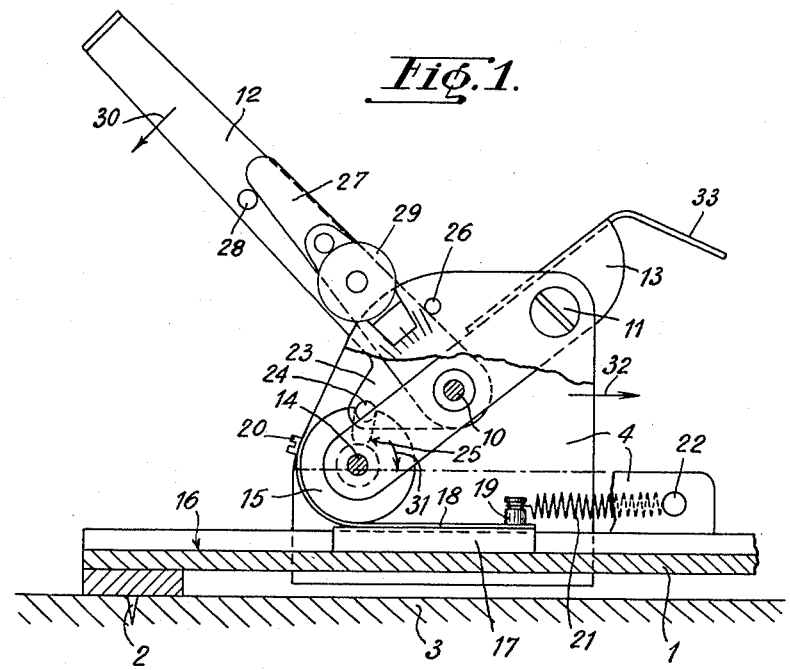
Figure 1 is an elevation of the apparatus, partly in section.

Spring 21 drags on the ribbon 18 and maintains the roller 15, therefore the lever 12, in the position shown in Figure 1. In this position the stop 28 is in contact with the arm 27. Moving the arm 12 in the direction of the arrow 30 causes the roller 15 to move in the direction of the arrow 31, against the pull of the spring 21. During the oscillation of the lever 12, the roller 15 presses strongly on the slide member 17, tending to drive it into the groove 16. By means of this strong pressure the slide member 17 is locked in the groove 16. The roller 15 moves towards the pillar 19, winding up the ribbon 18 and causing the carriage 4 with its attachments to move in relation to the slide guide 1 in the direction of the arrow 32. The lever 12, when stopping against the roller 15 is stopped in its motion in the direction of the arrow 30, and the carriage 4 is at the end of its forward movement. On releasing the lever 12, the strong pressure exercised by the roller 15 on the slide member 17 is lifted and the latter can then move along in the groove 16. Under the action of the spring 21, the slide member 17 advances in the groove 16, the carriage 4 remaining in its position by reason of friction on the slide guide 1, and the lever 12 going up under the action of the roller 15 until the stop 28 rests on the arm 27. The to and fro movement of the lever 12 which has just been described has caused a forward motion of the carriage 4, and a line may be traced by means of a tracing instrument and the ruler fitted in the slot 7.

Pressure exerted on the end 33 of the lever 13 will free the carriage 4 and enable it to return along the slide guide 1 in the opposite direction to the arrow 32. This pressure lifts the roller 15 and unlocks the slide member 17 from the slide guide 1, the carriage 4 and its attachments may then be moved along the slide guide 1 in the opposite direction to the arrow 32. Operation of the lever 12 will again cause the carriage to advance in the direction of the arrow 32.

What I claim is:

1. Set shift device comprising a slide guide adapted to be immobilized relative to said surface, a carriage movable on said slide guide and normally held frictionally thereon, an arm pivoted to said carriage and having a free end, an oscillating lever pivotally connected to said carriage and movable by an outside force in one direction towards said slide guide and adapted to be returned in an opposite direction, a roller journalled at said free end of said arm and rotatable in opposite directions from and to an initial position, said oscillating lever being arranged to rotate said roller from said initial position upon being moved by an outside force in said one direction and simultaneously to exert pressure against said roller for pressing said roller in said one direction, thereby moving said carriage in a forward direction, a power member operably connected to said carriage and adapted to return said roller to its initial position upon termination of the application of outside force against said oscillating lever, said slide guide having a groove, an elongated slide member guided in said groove and connected to said power member and adapted to move longitudinally in said groove and to be pressed thereinto for frictionally engaging said groove to restrain temporarily movement of said slide member, a flexible driving member connected to said slide member and to said roller and adapted to be wound upon the latter, whereby, when the roller is set in motion by said oscillating lever in the direction of the forward motion of the carriage said slide member is locked in said groove by the pressure exercised upon it by said roller in said first named one direction and the roller rolls slip-free on the slide member by means of the said driving member winding itself on the said roller thus causing said carriage to move forward, and conversely, when said oscillating lever is released, said slide member is released to slide in said groove in the same direction as that of the forward motion of the carriage under the impulse of said power member and said driving member is unwound from said roller and returning said roller and said oscillating lever to their initial positions relative to the carriage.

2. Set shift device comprising a slide guide adapted to be immobilized relative to said surface, a carriage movable on said slide guide and normally held frictionally thereon, an arm pivoted to said carriage and having a free end, an oscillating lever pivotally connected to said carriage and movable by an outside force in one direction towards said slide guide and adapted to be returned in an opposite direction, a roller journalled at said free end of said arm and rotatable in opposite directions from and to an initial position, said oscillating lever being arranged to rotate said roller from said initial position upon being moved by a noutside force in said one direction and simultaneously to exert pressure against said roller for pressing said roller in said one direction, thereby moving said carriage in a forward direction, a power member operably connected to said carriage and adapted to return said roller to its initial position upon termination of the application of outside force against said lever, said slide guide having a groove, an elongated slide member guided in said groove and connected to said power member and adapted to move longitudinally in said groove and to be pressed thereinto for frictionally engaging said groove to restrain temporarily movement of said slide member, a flexible driving member connected to said slide member and to said roller and adapted to be wound upon the latter, whereby when the roller is set in motion by said oscillation lever in the direction of the forward motion of the carriage said slide member is locked in said groove by the pressure exercised upon it by said roller in said first named one direction and the roller rolls slip-free on the slide member by means of the said driving member winding itself on the said roller thus causing said carriage to move forward, and conversely when said oscillating lever is released, said slide member is released to slide in said groove in the same direction as that of the forward motion of the carriage under the impulse of said power member and said driving member is unwound from said roller and returning said roller and said oscillating lever to their initial positions relative to the carriage, said groove and said slide member having a trapezoidal transverse sectional contour, said roller pressing against the large base of said slide member while being under pressure from said oscillating lever and said slide member resting with its sides against the lateral sides of said groove.

3. Set shift device comprising a slide guide adapted to be immobilized relative to said surface, a carriage movable on said slide guide and normally held frictionally thereon, an arm pivoted to said carriage and having a free end, an oscillating lever pivotally connected to said carriage and movable by an outside force in one direction towards said slide guide and adapted to be returned in an opposite direction, a roller journalled at said free end of said arm and rotatable in opposite directions from and to an initial position, said oscillating lever being arranged to rotate said roller from said initial position upon being moved by an outside force in said one direction and simultaneously to exert pressure against said roller for pressing said roller in said one direction, thereby moving said carriage in a forward direction, a power member operably connected to said carriage and adapted to return said roller to its initial position upon termination of the application of outside force against said lever, said slide guide having a groove, an elongated slide member guided in said groove and connected to said power member and adapted to move longitudinally in said groove and to be pressed thereinto for frictionally engaging said groove to restrain temporarily movement of said slide member, a metal band connected to said slide member and to said roller and adapted to be wound upon the latter, whereby, when the roller is set in motion by said oscillating lever in the direction of the forward motion of the carriage said slide member is locked in said groove by the pressure exercised upon it by said roller in said first named one direction and the roller rolls slip-free on the slide member by means of the said driving member winding itself on the said roller thus causing said carriage to move forward, and conversely, when said oscillating lever is released, said slide member is released to slide in said groove in the same direction as that of the forward motion of the carriage under the impulse of said power member and said driving member is unwound from said roller and returning said roller and said oscillating lever to their initial positions relative to the carriage.

4. Set shift device comprising a slide guide adapted to be immobilized relative to said surface, a carriage movable on said slide guide and normally held frictionally thereon, an arm pivoted to said carriage and having a free end, an oscillating lever pivotally connected to said carriage and movable by an outside force in one direction towards said slide guide and adapted to be returned in an opposite direction, a roller journalled at said free end of said arm and rotatable in opposite directions from and to an initial position, said oscillating lever being arranged to rotate said roller from said initial position upon being moved by an outside force in said one direction and simultaneously to exert pressure against said roller for pressing said roller in said one direction, thereby moving said carriage in a forward direction, a power member operably connected to said carriage and adapted to return said roller to its initial position upon termination of the application of outside force against said oscillating lever, said slide guide having a groove, an elongated slide member guided in said groove and connected to said power member and adapted to move longitudinally in said groove and to be pressed thereinto for frictionally engaging said groove to restrain temporarily movement of said slide member, a flexible driving member connected to said slide member and to said roller and adapted to be wound upon the latter, whereby, when the roller is set in motion by said oscillating lever in the direction of the forward motion of the carriage said slide member is locked in said groove by the pressure exercised upon it by said roller in said first named one direction and the roller rolls slip-free on the slide member by means of the said driving member winding itself on the said roller thus causing said carriage to move forward, and conversely, when said oscillating lever is released, said slide member is released to slide in said groove in the same direction as that of the forward motion of the carriage under the impulse of said power member and said driving member is unwound from said roller and returning said roller and said oscillating lever to their initial positions relative to the carriage and means connecting the driving member with the roller and the slide member in such a manner that the driving member simultaneously acts on said slide member as well as on said driving member.

5. Set shift device comprising a slide guide adapted to be immobilized relative to said surface, a carriage movable on said slide guide and normally held frictionally thereon, an arm pivoted to said carriage and having a free end, an oscillating lever pivotally connected to said carriage and movable by an outside force in one direction towards said slide guide and adapted to be returned in an opposite direction, a roller journalled at said free end of said arm and rotatable in opposite directions from and to an initial position, said oscillating lever being arranged to rotate said roller from said initial position upon being moved by an outside force in said one direction and simultaneously to exert pressure against said roller for pressing said roller in said one direction, thereby moving said carriage in a forward direction, and a power member operably connected to said carriage and adapted to return said roller to its initial position upon termination of the application of outside force against said oscillating lever, said slide guide having a groove, an elongated slide member guided in said groove and connected to said power member and adapted to move longitudinally in said groove and to be pressed thereinto for frictionally engaging said groove to restrain temporarily movement of said slide member, and a flexible driving member connected to said slide member and to said roller and adapted to be wound upon the latter, whereby, when the roller is set in motion by said oscillating lever in the direction of the forward motion of the carriage said slide member is locked in said groove by the pressure exercised upon it by said roller in said first named one direction, and the roller rolls slip-free on the slide member by means of the said driving member winding itself on the said roller thus causing said carriage to move forward, and conversely, when said oscillating lever is released, said slide member is released to slide in said groove in the same direction as that of the forward motion of the carriage, under the impulse of said power member, and said driving member is unwound from said roller and returning said roller and said oscillating lever to their initial positions relative to the carriages and including means for limiting the extent of movement of said oscillating lever in one direction, said arm being adjustable for positioning the same thereby to restrict the amplitude of the oscillating lever motion in one direction.

6. Set shift device comprising a slide guide adapted to be immobilized relative to said surface, a carriage movable on said slide guide and normally held frictionally thereon, an arm pivoted to said carriage and having a free end, an oscillating lever pivotally connected to said carriage and movable by an outside force in one direction towards said slide guide and adapted to be returned in an opposite direction, a roller journalled at said free end of said arm and rotatable in opposite directions from and to an initial position, said oscillating lever being arranged to rotate said roller from said initial position upon being moved by an outside force in said one direction and simultaneously to exert pressure against said roller for pressing said roller in said one direction, thereby moving said carriage in a forward direction, a power member operably connected to said carriage and adapted to return said roller to its initial position upon termination of the application of outside force against said oscillating lever, said slide guide having a groove, an elongated slide member guided in said groove and connected to said power member and adapted to move longitudinally in said groove and to be pressed thereinto for frictionally engaging said groove to restrain temporarily movement of said slide member, a flexible driving member connected to said slide member and to said roller and adapted to be wound upon the latter, whereby, when the roller is set in motion by said oscillating lever in the direction of the forward motion of the carriage said slide member is locked in said groove by the pressure exercised upon it by said roller in said first named one direction and the roller rolls slip-free on the slide member by means of the said driving member winding itself on the said roller thus causing said carriage to move forward, and conversely, when said oscillating lever is released, said slide member is released to slide in said groove in the same direction as that of the forward motion of the carriage under the impulse of said power member and said drive member is unwound from said roller and returning said roller and said oscillating lever to their initial positions relative to the carriage, a pin mounted on said oscillating lever and a slot disposed in said roller and adapted to receive said pin, said pin arranged to engage said slot of said roller thereby causing said roller to rotate when said oscillating lever moves in said first named one direction.

7. Set shift device comprising a slide guide adapted to be immobilized relative to said surface, a carriage movable on said slide guide and normally held frictionally thereon, an arm pivoted to said carriage and having a free end, an oscillating lever pivotally connected to said carriage and movable by an outside force in one direction towards said slide guide and adapted to be returned in an opposite direction, a roller journalled at said free end of said arm and rotatable in opposite directions from and to an initial position, said oscillating lever being arranged to rotate said roller from said initial position upon being moved by an outside force in said one direction and simultaneously to exert pressure against said roller for pressing said roller in said one direction, thereby moving said carriage in a forward direction, a power member operably connected to said carriage and adapted to return said roller to its initial position upon termination of the application of outside force against said oscillating lever, said slide guide having a groove, an elongated slide member guided in said groove and connected to said power member and adapted to move longitudinally in said groove and to be pressed thereinto for frictionally engaging said groove to restrain temporarily movement of said slide member, a flexible driving member connected to said slide member and to said roller and adapted to be wound upon the latter, whereby, when the roller is set in motion by said oscillating lever in the direction of the forward motion of the carriage said slide member is locked in said groove by the pressure exercised upon it by said roller in said first named one direction, and the roller rolls slip-free on the slide member by means of the said driving member winding itself on the said roller thus causing said carriage to move forward, and conversely, when said oscillating lever is released, said slide member is released to slide in said groove in the same direction as that of the forward motion of the carriage under the impulse of said power member and said driving member is unwound from said roller and returning said roller and said oscillating lever to their initial positions relative to the carriage, said pivoted arm carrying said roller being movable and manually operable in a direction for removing the said roller off said slide guide.

LOUIS BORDIGONI.

REFERENCES CITED

The following references are of record in the file of this patent:

UNITED STATES PATENTS

| Number | Name | Date |
| --- | --- | --- |
| 220,196 | Ward | Sept. 30, 1879 |
| 1,832,112 | Gessner | Nov. 17, 1931 |

FOREIGN PATENTS

| Number | Country | Date |
| --- | --- | --- |
| 36,831 | Sweden | May 27, 1914 |